UNITED STATES PATENT OFFICE.

JOHN H. HAYWARD, OF JERSEY CITY, NEW JERSEY.

IMPROVEMENT IN THE MANUFACTURE OF FLOOR-CLOTH FROM RUBBER.

Specification forming part of Letters Patent No. 196,147, dated October 16, 1877; application filed May 15, 1877.

*To all whom it may concern:*

Be it known that I, JOHN H. HAYWARD, of Jersey City, in the State of New Jersey, have made certain new and useful improvements in the manufacture and treatment of what is commonly known as "vulcanized-rubber packing" or "sheet-rubber," by means of which I produce a new article of covering for floors, tables, pianos, &c., and similar purposes; and I hereby declare the following specification to be a full and clear description of said improvements.

The principal feature of my invention consists in so manufacturing or treating that kind of rubber compound now generally used for packing, as that from about the same substance a new article is produced suitable to be used for floor-cloth, table-covers, and analogous purposes, which article will be less expensive and more durable than any material for such covering now in use.

The first part of my invention consists in manufacturing or preparing the sheet-rubber or packing so that it will be in a proper condition to receive and retain upon its surface a paint to be used for the purpose of stamping, printing, or painting designs thereon, and is as follows:

In the manufacture of the sheet-rubber or packing it is necessary to roll it out into sheets of the proper width and thickness while in a plastic state before vulcanizing or curing, and, in this operation of rolling, the rubber must be prevented from sticking to calender-rollers, which is accomplished by the use of different substances, such as pulverized soap-stone, terra alba, &c., these substances also being used to give a finished appearance or surface to the packing thus produced.

When the sheets of rubber manufactured in this manner are finished the surfaces necessarily remain covered with the soap-stone or other substance used in the rolling, and are thereby rendered unfit to receive paint of any kind by which designs may be traced thereon; therefore the first object of my invention is either to manufacture the rubber material or (if already manufactured in the usual manner) prepare it so that its surfaces will be free from all the foreign substances now used in the rolling process referred to, in order that such surfaces will be in a proper condition to receive and retain a paint or coloring material when applied.

In order to accomplish this object, in case I manufacture the rubber myself, I interpose a cloth of fine wire-gauze or other suitable material between the rollers and the surfaces of the plastic rubber, so as to dispense with the use of soap-stone or other foreign powdered substance, and then, when sufficiently rolled, I either cure the rubber with this outer layer of cloth on, and remove it after curing, or remove it before submitting the rubber to the oven, so that when cured or hardened it will present a clean surface, slightly roughened by the impress of the cloth, but free from soap-stone or other foreign substance, although in some instances it may be advisable to leave a cloth on one side as a backing.

In case I design to use packing already manufactured in the usual manner, I first prepare it to receive the paint directly upon the rubber surface by subjecting it to a wash of naphtha or other similar fluid until all foreign matter, such as soap-stone, terra-alba, sulphur, &c., is entirely removed, and a perfectly-clean surface produced, in order that the paint, on being applied, will unite with the rubber compound and virtually produce a chemical cohesion of parts.

After having prepared or produced the rubber packing or cloth in a proper state to receive and retain a coloring substance, I next apply a paint which is preferably prepared, for the purpose of more perfectly combining with the rubber surface, from the following ingredients, and in about the proportions set forth, viz: Asbestus, eight parts; caoutchouc, dissolved in benzine, four parts; gum-copal, dissolved in turpentine, two parts; turpentine, two parts; litharge, two parts; gum-shellac, dissolved in alcohol, two parts.

The paint is then applied to the prepared surface of the rubber or packing either by hand with a brush, or it may be stamped or printed onto it by other means, such as those used in printing oil-cloths and other similar articles.

If desired, the paint may be applied to both sides of the rubber or packing, so that when one side is worn the other may be turned up.

What I claim as my invention, and desire to secure by Letters Patent as my invention, is—

1. The hereinbefore-described process of first manufacturing or preparing sheet-rubber so that its surface will be free from foreign substances and ready to receive and retain paint, and then painting or stamping it with a suitable article of paint, substantially in the manner and for the purposes set forth.

2. As a new article of manufacture, a floor-cloth, or covering for other purposes, composed of vulcanized sheet-rubber so manufactured or prepared that its surface is free from earthy or other foreign deleterious substances, and painted or stamped with a suitable article of paint, in the manner and for the purpose substantially as set forth.

3. In the manufacture of sheet-rubber to be used for floor-cloth, the interposition of a fine wire gauze or cloth between the plastic rubber and the calender-rollers during the process of rolling it into sheets, in the manner and for the purposes set forth.

J. H. HAYWARD.

Witnesses:
 JAMES H. HUNTER,
 WILLIAM H. LEWIS.